Figure 1:
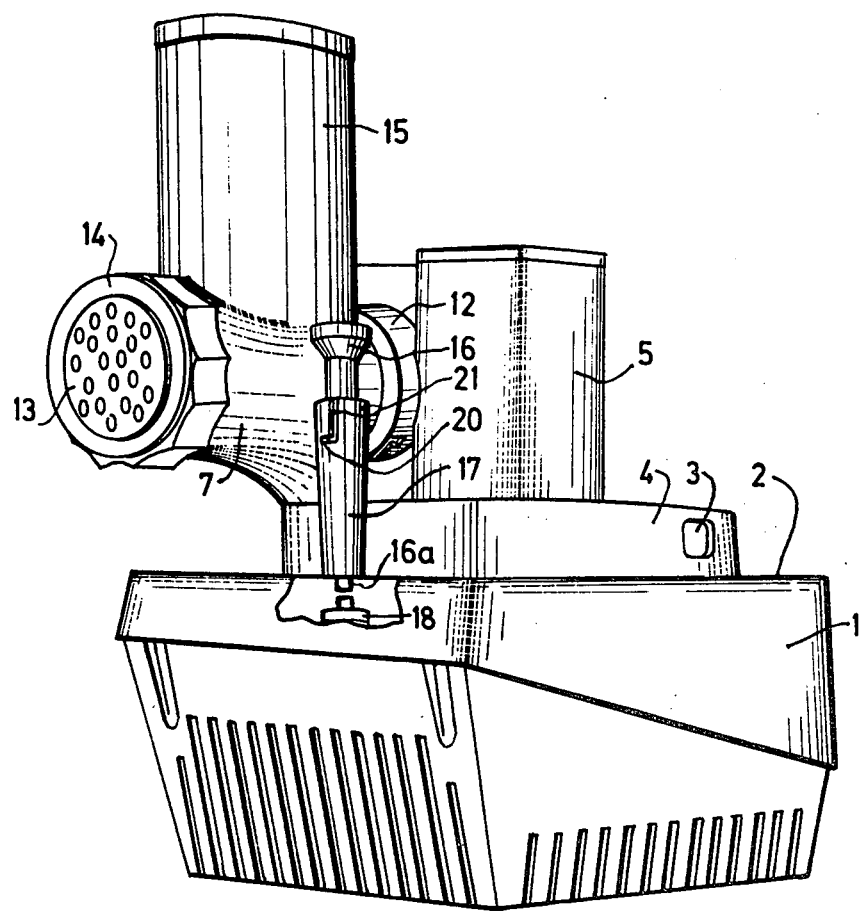

United States Patent [19]

Coggiola

[11] Patent Number: 4,470,788
[45] Date of Patent: Sep. 11, 1984

[54] APPARATUS FOR EXTRUDING FOOD PASTES

[75] Inventor: Marcel E. Coggiola, Le Perreux, France

[73] Assignee: Robot-Coupe, S.A., Paris, France

[21] Appl. No.: 417,884

[22] Filed: Sep. 14, 1982

[30] Foreign Application Priority Data

Sep. 18, 1981 [FR] France .................. 81 17620

[51] Int. Cl.³ .................. B29D 7/02; A21C 3/08
[52] U.S. Cl. .................. 425/151; 425/376 R
[58] Field of Search .............. 425/153, 161, 162, 151, 425/152, 376 R; 264/40.7; 99/512, 513; 241/37.5, 92, 282.1; 366/206, 601

[56] References Cited

U.S. PATENT DOCUMENTS

| 3,014,515 | 12/1961 | Meeker et al. | 241/37.5 |
| 4,095,499 | 6/1978 | Ades | 241/37.5 |
| 4,138,066 | 2/1979 | Mullins et al. | 241/282.1 |
| 4,216,917 | 8/1980 | Clare et al. | 241/37.5 |
| 4,226,373 | 10/1980 | Williams | 241/37.5 |
| 4,362,277 | 12/1982 | Amiot | 241/37.5 |
| 4,371,118 | 2/1983 | Sontheimer et al. | 241/37.5 |

FOREIGN PATENT DOCUMENTS

| 50409 | 4/1982 | European Pat. Off. | 425/376 R |
| 2715956 | 10/1978 | Fed. Rep. of Germany | 241/282.1 |

Primary Examiner—Willard E. Hoag
Attorney, Agent, or Firm—Robert Scobey

[57] ABSTRACT

A screw-extruder for shaped food pastes such as spaghetti is removably mounted on a base containing a prime mover. To ensure the safety of the assembly an activator is associated with the cylinder housing the screw and can only actuate a switch in the base when the cylinder is correctly positioned. The actuator may take the form of a manually operable pushbutton on the cylinder, or a lever acted on by the cylinder and acting as a mechanical interlock with a pushbutton and permitting its operation only when predetermined conditions are satisfied. In each case the pushbutton will only act to permit operation of the motor when it is properly positioned relative to a switch in the base.

10 Claims, 13 Drawing Figures

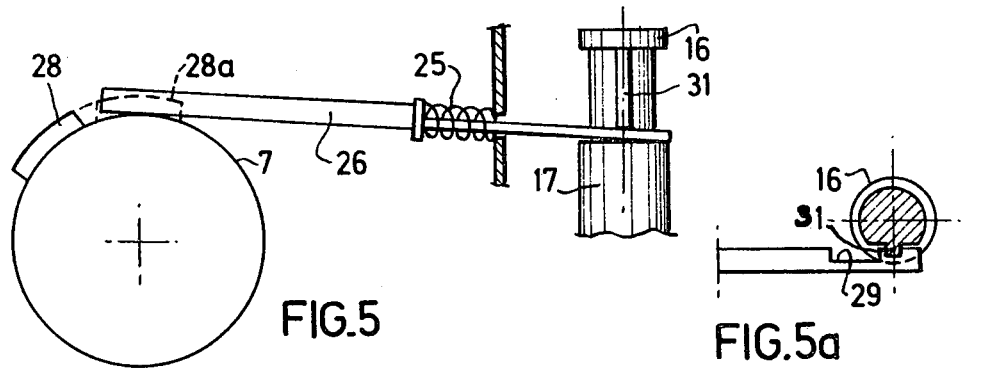
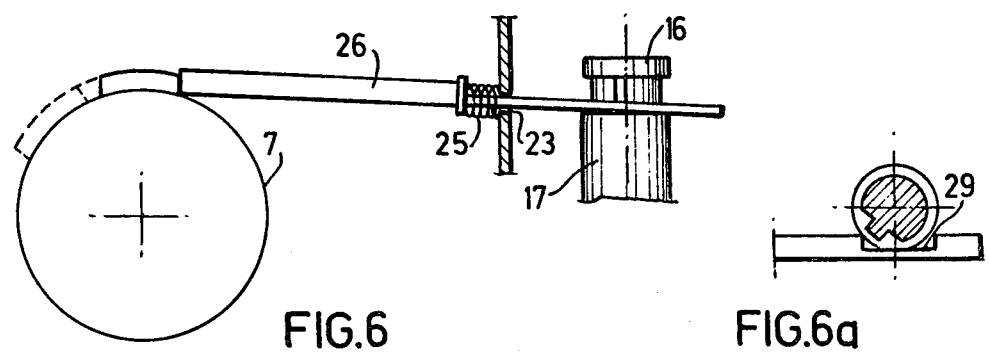
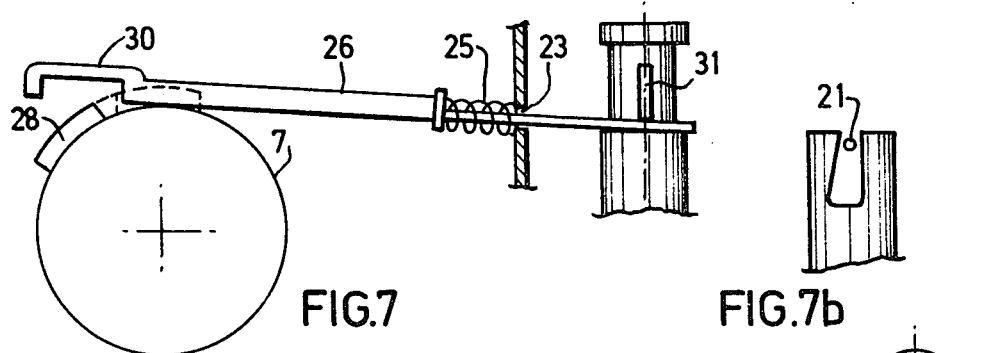
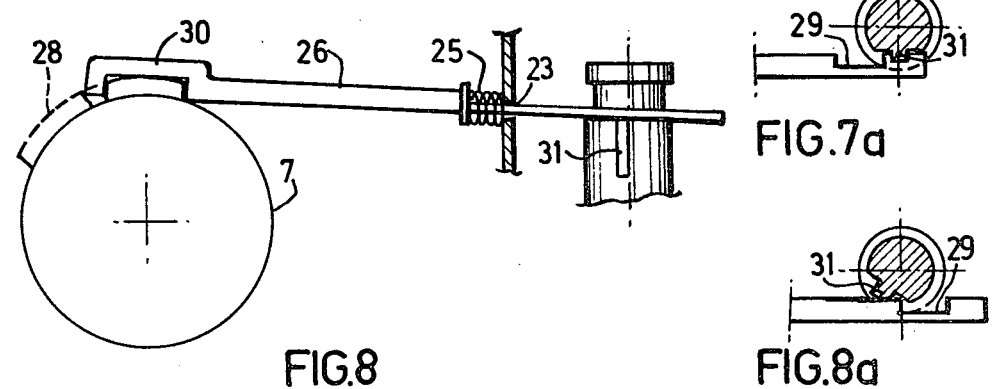

APPARATUS FOR EXTRUDING FOOD PASTES

FIELD OF THE INVENTION

The present invention has for its object an apparatus intended in particular but not exclusively for the extrusion of shaped food pastes (pastas) such as spaghetti, tagliatelli and macaroni from a mass of paste or dough. More particularly the invention is concerned with domestic apparatus rather than high-capacity commercial manufacturing apparatus.

BACKGROUND OF THE INVENTION

Apparatus of this type are known and essentially include an endless screw driven by an electrical motor turning in a cylinder at one of the ends of which a feed hopper enters, the other end being obstructed by a grille penetrated by holes of a predetermined diameter. The archimedian screw ensures both the transport of the paste introduced into the hopper and the pressure necessary to press the paste through the grille. Similar devices are also used for mincing meat.

Kitchen apparatus are also known which by the addition of an appropriate attachment carry out any one of a great number of functions such as mincing, chopping, grating, etc. One such apparatus is described in French Pat. No. 7127039. This apparatus is made up of a stand enclosing an electric motor on which is added a removable bowl, the motor not being able to be operated unless the bowl is properly mounted on the stand and is closed by a lid. The functioning of this apparatus is thus very foolproof. However, because of the various jobs to be done by the apparatus the electric motor turns at about 1500 revs per minute whereas for an apparatus for the extrusion of food paste the speed of rotation of the screw should be about 30 revs per minute.

SUMMARY OF THE INVENTION

The present invention has for its object an apparatus which can be mounted on the stand of a multi-purpose kitchen apparatus for example of the type described in the said French patent and give the same safety in operation against any contact of the hand with the tool while that is in rotation.

This is achieved by mounting an actuator such as a pushbutton on the extrusion apparatus which is only aligned with a safety switch on the stand when the apparatus is properly mounted and safe to start work. To allow proper cleaning the cylinder should be removable from the rest of the apparatus and to assure proper positioning of the cylinder in the extrusion apparatus (and therefore relative to the stand) the push button may be directly mounted with the cylinder or may be associated with it through a mechanical interlock. The lever forming the mechnical interlock is driven by lugs on the cylinder which form a bayonet fit with a casing of the apparatus. Only when the lugs have been inserted and turned to a locked position is the push button freed by the interlock. The push button may be manually locked into the actuating position if it is on the cylinder but if it is associated through the interlock, the interlock preferably acts both to prevent actuation before the cylinder is properly locked on and to hold the push button in actuating position, but only for so long as the cylinder remains correctly locked, since the push button is biased away from the actuating position by a return spring.

The switch can be either an electro-mechanical switch or a magnetic contact actuated by a permanent magnet.

DESCRIPTION OF THE FIGURES AND OF SPECIFIC EMBODIMENTS

Figure 2:
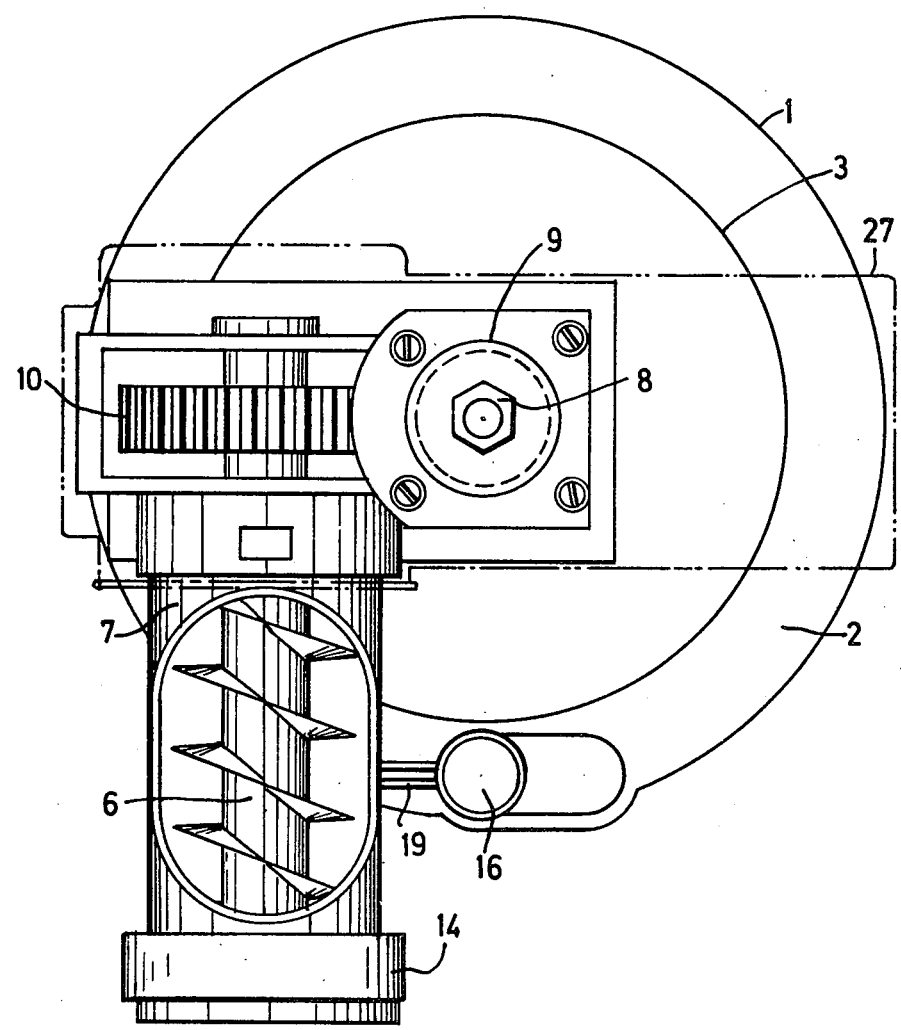
Figure 3:
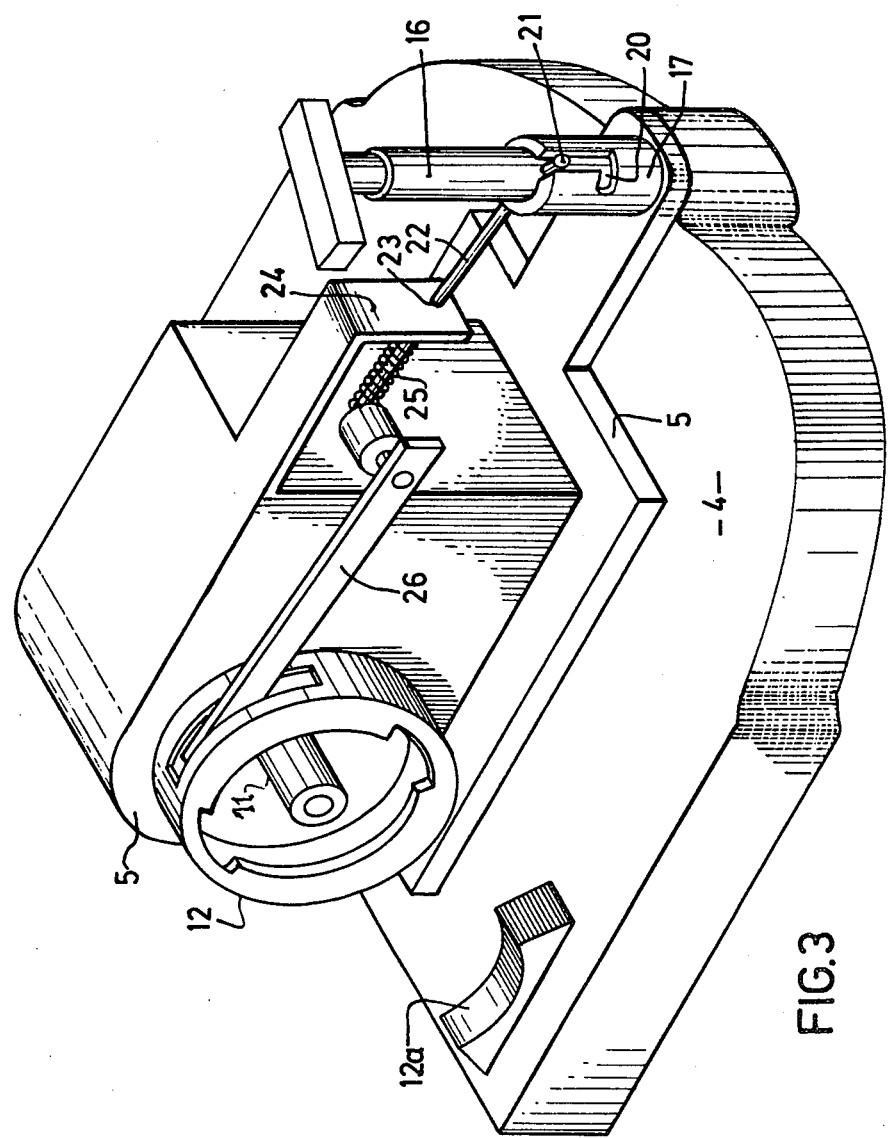
Figure 4:
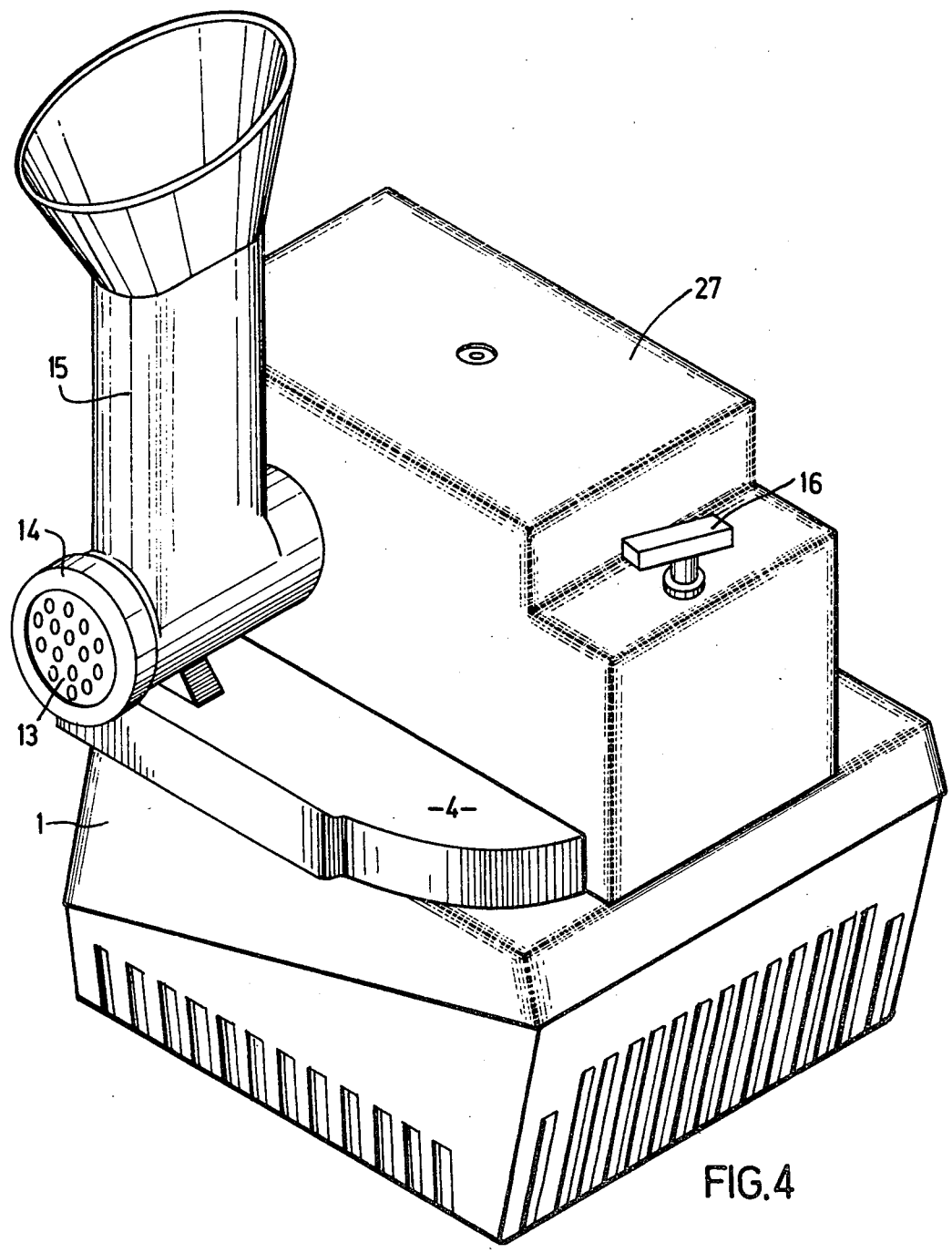

Further characteristics and advantages of the invention will appear in the course of the description which will follow of particular embodiments, given solely by way of non-limitative example with reference to the figures which show:

FIG. 1, a view in perspective of a food paste extrusion apparatus according to the present invention;

FIG. 2, a view from above of the same apparatus, the protective casing being removed;

FIG. 3, another embodiment of the security device, the cylinder and screw having been removed;

FIG. 4, a perspective view of the apparatus in working order;

FIGS. 5 to 8 details of the mechanism of the second embodiment.

The apparatus seen in FIG. 1 is made up of a stand 1 enclosing an electric motor (not shown) of the type described in the said patent and of which the upper surface 2 has a cylindrical boss on which the base 4 can be attached by means of pegs 3 co-operating with bayonet ridges provided in the base 4 of the extrusion apparatus which is thus mounted removably in the stand 1. The base 4 supports a casing 5 intended to contain gearing and to allow removable mounting both of the endless screw 6 and of the cylindrical cage 7 (see FIG. 2).

The motor shaft (not shown) projects from the centre of the stand 1 and carries a flat. A sleeve 8 slides on the motor shaft and by its external surface which is six-sided drives a worm 9 which engages with a pinion 10 which is journalled in the casing 5. The worm and the pinion are calculated in order to cause a reduction in the speed of rotation from 1500 revs per minute to 30 revs per minute.

As appears from FIG. 3 the pinion 10 is fixed to a hollow axle 11 which projects from the casing and of which the interior has a hexagonal section to allow the introduction and driving of the end of the screw 6. The end of the axle 11 is surrounded by a crown 12 fixed on the casing 5 and which has bayonet notches inside which lugs provided on the rear end of the cylinder 7 penetrate in such a way as to hold the cylinder 7 on the casing 5. The cylinder 7 also bears on a cradle 12a formed on the base 4. In FIG. 1 you can see that the forward end of the cylindrical cage 7 is closed by a grille 13 which is also removable and is fixed on that cylinder 7 by a screw ring 14. Of course this grille has a large number of orifices of which the disposition and the size (or, more generally, the dimensions) vary from one grille to another, the dimensions of each orifice allowing one to get differently formed pastes. The cylindrical cage 7 is surmounted by a hopper 15 or feed spout serving for the introduction of the paste into the cylinder. In general the operation of the apparatus can be as follows: first the base 4 is placed on the stand 1 which causes the connection of the screw 9 with the output shaft of the motor. Then the screw 6 is introduced into the cavity of the axle 11 by its rear end. It can be seen that this time the motor should not be powered in any way. Lastly, the cylinder 7 is put into place and a grille 13 is screwed onto its forward end.

According to one characteristic of the invention it is the cylinder 7 which has means allowing the closing of a switch (not shown) which is positioned inside the stand and more particularly inside the forward part of this.

In the embodiment shown in FIGS. 1 and 2 a push button 16 is mounted to slide in a vertical direction inside a sleeve 17 which is fixed relative to the cylinder 7 and which comes to be positioned over the orifice formed in the base to allow the passage of the push button (or, more exactly, of its lower part 16a) to come into contact with the button of the switch 18 which controls the power to the motor. The slide 17 can be moulded with the cylinder 7. The guiding and locking of the push button 16 in the slide 17 is ensured by bayonet grooves 20 inside which slide lugs 21 which are perpendicular to the axis of the push button. The push button 16 is provided with a return spring (not shown) which permanently tends to urge it upwardly when the lugs 21 are disengaged from the bayonet notches. It is therefore displaceable between two positions which are respectively an upper position in which no action is effected on the switch 18 and a locked lower position in which the extremity 16a of the push button comes to bear on the contact 18 to close the latter. This situation can however only happen when the cylinder is in place. If the switch 18 is a magnetic switch of the reed switch type, the end 16 of the push button carries a permanent magnet (not shown). Thus when the cylinder is in place the user presses on the push button 16 and makes it do one-eighth of a turn which causes the locking of the latter and the closing of the switch. The apparatus is then ready to work. Of course the difficulties which are overcome by the invention arise because the various elements are dismountable. This feature arises because the apparatus must be easily cleaned after every use.

Given the position of the switch 18 on pre-existing stands the extruded pastes leave the front of the apparatus in the embodiment of FIGS. 1 and 2. Without modifying the position of the switch 18 it is possible as is shown in FIGS. 3 and 4 to obtain extrusion of the pastes to the side of the apparatus. As before the push button 16 is mounted sliding in a vertical slide 17 which is fixed not on the cylinder but on the casing 5. When the base 5 is suitably positioned on the stand 1 the push button finds itself above the switch 18. Its descent is however blocked by a laterally movable rod 22 guided by the orifice 23 of a bracket 24, and brought to a rearward position by a return spring 25. The forward displacement of the said rod, freeing the push button, is dependent on a lever 26 which penetrates into the slot 27 provided in the crown 12 and of which the end is pushed back by a boss formed on the part of the cylinder 7 which penetrates the interior of the crown 12 and permits the latter to be fixed on the casing 5. The forward or outward movement of the rod 22 frees a peg and the push button 16 can descend and be locked against the action of its return spring.

FIG. 4 shows an apparatus according to the second embodiment as it is in practice. The casing and the safety devices are included inside a cover or shroud 27.

Such a shroud is of course provided in the embodiment of FIGS. 1 and 2.

FIGS. 5, 5a and 6 and 6a show respectively in face view and in plan view a first mechanism utilisable in the second embodiment, in the position of rest and locked up. In FIG. 5 one can again see the cylinder 7 and its boss 28 which activates the lever 26 provided with the spring 25. In this embodiment the lever 26 has at its forward end (right in FIGS. 5 and 6) a notch 29 (FIG. 5a) which allows the passage of the ridge 31 formed along the generatrix of the push button 16. During mounting the elements are in the position shown in FIG. 5. The push button 16 cannot descend because it is blocked by the contact of the lower end of the ridge 31 on the lever 26. It is only by a displacement to the right that the notch 29 is brought below the ridge 31 and allows the descent of the push button 16 inside its guide 17. Now this displacement corresponds to the pushing by the boss 28 of the rear end of the lever 26, that is to say to the locking of the cylinder 7 on the stand. The elements therefore occupy the position shown in FIG. 6 and the push button 16 is locked in this position by the assembly of the lug 21, and bayonet 20 shown in FIG. 3.

However in the preceding embodiment rotational dismounting or unlocking of the cylinder does not cause automatic stopping of the motor. This result can be got by the mechanism shown in FIGS. 7, 7a, 7b, 8 and 8a which show the latter in its rest position (FIG. 7) and work position (FIG. 8). The elements are the same as before. However in order to ensure good co-operation between the lever 26 and the boss 28, the lever is terminated at its rear end by a stirrup 30 which can surround the boss 28 in such a way that any movement of the boss and of the cylinder will affect the lever which will be given an advancing or retreating movement. Under these conditions the spring 25 can be disposed of without disadvantage. In contrast with the previous mechanism there are no means in the cylinder 17 for blocking the push button 16. This blockage is only assured by contact of the upper end of the ridge 31 with the lower face of the lever 26. Blockage in the rest position is analogous to that of FIGS. 5 and 6, that is to say it is the lower end of the ridge 31 which bears on the upper face of the lever 26 (FIG. 7a) while the opposite occurs in the work position (FIG. 8a). Between these two positions there is the passage of the ridge 31 in the notch 29 which preferably is narrower than previously. When the cylinder 7 is unlocked by rotation the lever 26 is displaced to the left and the ridge 31 arrives opposite the notch 29 through which it can go under the thrust of the push button return spring (not shown) which automatically tends to urge the push button back upwardly. Thus, when the cylinder is unlocked the motor is automatically stopped.

I claim:

1. In combination, a stand having a horizontal support surface for removably supporting a food processing accessory, said stand containing a motor therein, an output shaft extending vertically through said horizontal support surface and driven by the motor for actuating said accessory, and at least one safety switch in said stand under said support surface for preventing operation of said motor unless said accessory is properly positioned on said support surface, and an accessory comprising a paste-extruding utensil or the like having a casing and a base removably connected to the stand, the utensil including an extrusion screw working in a horizontal cylinder, means coupling the output shaft to the screw, and an actuator on the utensil associated with said horizontal cylinder and registering with said safety switch only when said utensil is correctly positioned relative to said stand and operable to actuate said switch to a predetermined condition only when the cylinder is correctly positioned relative to said stand.

2. The combination as claimed in claim 1, the casing including said coupling means, and means removably connecting said cylinder to said casing, and guide means for said actuator associated with said cylinder whereby said registration and operability are achieved only when both the casing and the cylinder are correctly connected.

3. The combination as claimed in claim 1, the casing including said coupling means, and means removably connecting said cylinder to said casing, guide means for said actuator associated with said casing, interlock means associated with said actuator for permitting operability of the actuator only in at least one predetermined position of the interlock means, and lever means movable by said cylinder for moving the interlock means and causing adoption of said at least one predetermined position of the interlock means.

4. The combination as claimed in claim 3, wherein the cylinder is connected to the casing by a bayonet coupling, the lever means being positioned to be moved by rotation of the cylinder upon its proper engagement into the bayonet coupling to cause said adoption of said at least one predetermined position of the interlock means.

5. The combination as claimed in claim 4, wherein the lever means is removably coupled to the cylinder to be moved by rotation in each direction of rotation, said at least one predetermined position of the interlock means being associated only with rotation of the cylinder in one direction.

6. The combination as claimed in claim 5, wherein the interlock means comprises a notched bar with an upper and a lower face, the actuator comprises an axially slidable push button and an axially extending ridge on a side of the push button, an upper and a lower end of the ridge, the notch corresponding axially with and permitting passage of the ridge in one said predetermined position the one said end of the engaging one said face of the bar at one side of the notch in another said predetermined position and the other said end of the ridge engaging the other said face of the bar to prevent operability of the push button.

7. An accessory for extruding food pastes and the like in a food processor that includes a stand having a horizontal upper surface, an electric motor mounted within the stand and having an output shaft extending vertically through said upper surface and having an energizing circuit, a safety switch connected in series in the energizing circuit and fixed under the upper surface of the stand, said accessory comprising a casing removably mountable on the stand and a horizontal cylinder removably mountable on the casing, an extrusion screw in said cylinder and driven in rotation through gear means mechanically connected to the vertical output shaft of the motor, and a switch actuator associated with said cylinder and registering with said safety switch only when the casing is correctly positioned relative to said stand and when the cylinder is mounted on the casing.

8. An accessory as claimed in claim 7, in which said actuator comprises a base for removably mounting said casing to said stand, a push button guided in guide means, said guide means being fixedly mounted on said base, and lever means coupling said removable cylinder to said push button for actuating said safety switch only when said cylinder is in an operative position with respect to said casing.

9. A utensil according to claim 7, wherein the actuator is a push button guided in guide means fixed to the cylinder.

10. A utensil according to claim 7 in which the actuator is a push button guided in guide means fixed to the casing and interlock means associated with the push button is movably mounted for permitting movement of the push button to cause actuation of the safety device only in at least one predetermined position of the cylinder, and lever means engaged by the cylinder to move said interlock means.

* * * * *